（12） United States Patent
Park

(10) Patent No.: US 6,774,936 B1
(45) Date of Patent: Aug. 10, 2004

(54) DOOR VIDEOPHONE CAPABLE OF ROTATING A CAMERA

(76) Inventor: Jun-Jeong Park, #2-705 Shindong-A Apt., 44 Myungil-Dong, Kangdong-Gu, Seoul (KR)

( * ) Notice: Subject to any disclaimer, the term of this patent is extended or adjusted under 35 U.S.C. 154(b) by 0 days.

(21) Appl. No.: 09/547,914

(22) Filed: Apr. 11, 2000

(30) Foreign Application Priority Data

Apr. 13, 1999 (KR) .......................................... 1999-6052

(51) Int. Cl.[7] .......................... H04N 5/232; H04N 7/18; H04N 5/225
(52) U.S. Cl. .................. 348/211.99; 348/373; 348/156; 348/151
(58) Field of Search ........................... 348/14.01, 14.05, 348/143, 151, 156, 211.99, 373, 374, 375; 248/187.1; 396/419, 424, 428

(56) References Cited

U.S. PATENT DOCUMENTS 4,498,738 A  *  2/1985  Kumai .................... 359/874
5,717,379 A  *  2/1998  Peters .................... 340/539.25
5,745,166 A  *  4/1998  Rhodes et al. .............. 348/143
5,923,363 A  *  7/1999  Elberbaum .................. 348/156

FOREIGN PATENT DOCUMENTS

JP      04-330888   *  11/1992   ............ H04N/7/18
JP      08-070448   *  12/1996   ............ H04N/7/18

* cited by examiner

Primary Examiner—Ngoc-Yen Vu
Assistant Examiner—Timothy J. Henn
(74) Attorney, Agent, or Firm—Jacobson Holman PLLC

(57) ABSTRACT

A door videophone capable of rotating a camera, comprising: a main body having a monitor for displaying an image of a caller, and being located indoors; a bell box having the camera for photographing looks of the caller and transmitting the image of the caller to the monitor, and being located outdoors; an actuating device for rotating the camera, and being disposed in the bell box; and a control device for generating an operation control signal associated with the actuating device, and being disposed at the main body.

7 Claims, 11 Drawing Sheets

DOOR VIDEOPHONE CAPABLE OF ROTATING A CAMERA

FIELD OF THE INVENTION

The present invention relates to a door videophone for visually observing an outdoor caller and talking with the caller, and, more particularly, to a door videophone capable of rotating a camera in order to observe total looks of an outdoor caller.

DESCRIPTION OF THE PRIOR ART

Generally, when a caller calls at a person's house, it is necessary that a host of the house observes whether the caller is acquaintance or not and, then, opens a door.

Referring to FIG. 1, there is shown a conventional door videophone for observing a caller.

As shown in FIG. 1, the conventional door videophone includes a main body 10 having a monitor 12, a bell box 20 having a camera 22 for transmitting image of a caller to the monitor 12, an electronic lock 30 disposed at door and a power supply 40 for providing electric current to the main body 10, the monitor 20 and the lock 30. The main body 10 is located indoors and the bell box 20 is located outdoors.

The main body 10 also has a release switch 14 for unlocking the electronic lock 30, a hook switch 16 for operating the monitor 12 and a handset 18 for talking with the caller. The hook switch 16 is turn on when the handset 18 is lifted.

The bell box 20 also has a bell switch 24 for ringing a bell.

The operation of the conventional door videophone structured as above-mentioned will be explained.

When the caller turns on the bell switch 24 to ring the bell, a host lifts the handset 18 to turn on the hook switch 16. In this case, the image of the caller photographed by the camera 22 is displayed on the monitor 12 so that the host can observe the caller and, then, the host turns on the release switch 14 to unlock the electronic lock 30.

However, in the conventional door videophone, since the photographing direction of the camera cannot be adjusted, photographing area of the camera is extremely limited.

Therefore, when the caller gets out of the photographing area, the camera cannot photograph the total looks of the caller and, consequently, the host cannot correctly observe looks of the caller through the monitor.

SUMMARY OF THE INVENTION

It is, therefore, an object of the present invention to provide a door videophone capable of rotating a camera to enlarge a photographing area of the camera.

In accordance with an aspect of the present invention, there is provided a door videophone capable of rotating a camera, comprising: a main body having a monitor for displaying an image of a caller, and being located indoors; a bell box having the camera for photographing looks of the caller and transmitting the image of the caller to the monitor, and being located outdoors; an actuating means for rotating the camera, and being disposed in the bell box; and a control means for generating an operation control signal associated with the actuating means, and being disposed at the main body.

In accordance with another aspect of the present, there is provided an actuator for rotating a camera upward, downward, left and right, comprising: a base plate for supporting the camera; at least one first driving means for generating a rotation force to rotate the base plate upward and downward; at least one first transmitting means for transmitting the rotation force generated by the first driving means to the base plate; at least one second driving means for generating a rotation force to rotate the base plate left and right; at least one second transmitting means for transmitting the rotation force generated by the second driving means to the base plate; and a control means for generating an operation control signal associated with the first and second driving means.

BRIEF DESCRIPTION OF THE DRAWINGS

The above and other objects and features of the present invention will become apparent from the following description of the preferred embodiments given in connection with the accompanying drawings, in which.

DETAILED DESCRIPTION OF THE PREFERRED EMBODIMENTS

Hereinafter, embodiments of a door videophone in accordance with a present invention will be described in detail, referring to the accompanying FIGS. 2 to 7D.

Figure 1:
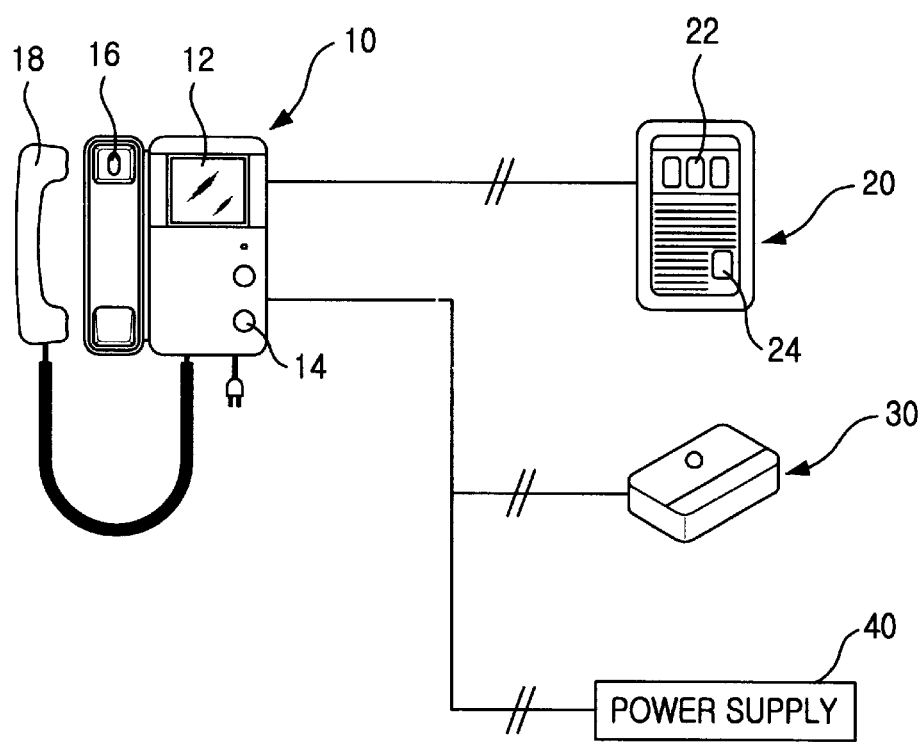
FIG. 1 is a system diagram showing a structure of a door videophone of a prior art.
Figure 2:
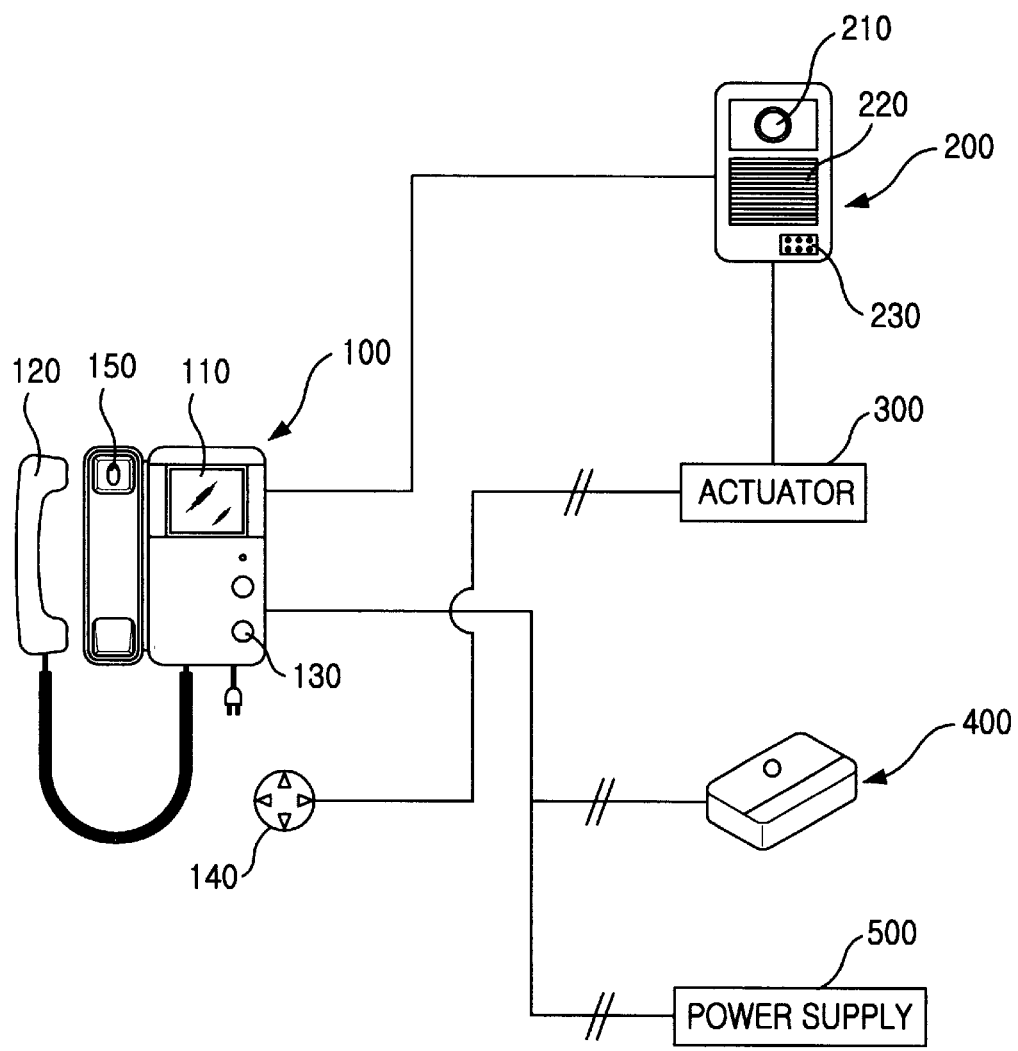
FIG. 2 is a system diagram illustrating a structure of a door videophone in accordance with a preferred embodiment of the present invention.

Referring to FIG. 2, there is shown a system diagram illustrating a structure of the door videophone in accordance with the present invention.

The door videophone in accordance with the present invention comprises a main body 100 having a monitor 110, a bell box 200 having a camera 210 for transmitting an image of a caller to the monitor 110, an actuator 300 for rotating the camera 210, an electronic lock 400 disposed in a door and a power supply 500 for providing electric current to the main body 100, the bell box 200, the actuator 300 and the lock 400.

The main body 100 includes a handset 120 for transmitting/receiving a voice signal, a release switch 130 for unlocking the electronic lock 400, a control switch 140 for generating an operation control signal associated with the actuator 300 and a hook switch 150 for turning on the monitor 110. Normally, the handset 120 is placed on the hook switch 150. In this state, when a host lifts the handset 120, the image photographed by the camera 210 is displayed on the monitor 110. The surface of the control switch 140 has four arrows respectively indicating upper, lower, left and right directions so that the host may easily adjust rotation direction of the camera 210 to be rotated by operation of the actuator 300.

The bell box 200 also includes a microphone and speaker 220 for transmitting/receiving the voice signal to/from the handset 120 and a bell switch 230 for ringing a bell.

Figure 3:
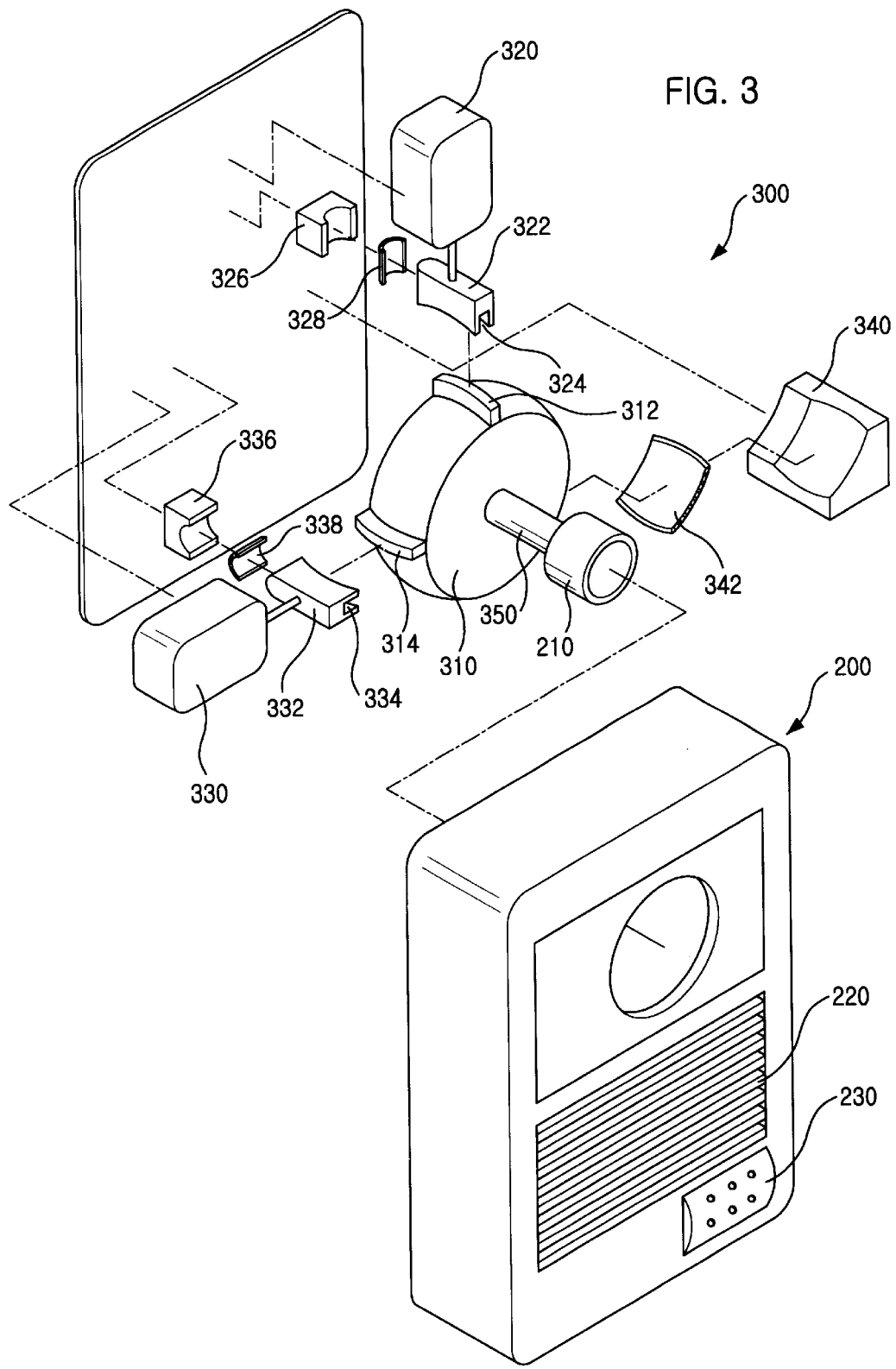
FIG. 3 is a disassembled perspective view depicting an embodiment of an actuator employed in the door videophone of the present invention.

FIG. 3 is a disassembled perspective view depicting an embodiment of the actuator employed in the door videophone of the present invention.

Referring to FIG. 3, the actuator 300 includes a base plate 310 for supporting the camera 210, a first driving motor 320 for rotating the base plate 310 in left and right direction as the operation control signal is outputted from the control switch 140, a second driving motor 330 for rotating the base plate 310 in upper and lower direction as the operation control signal and a bracket 340 for supporting the base plate 310. The first and second driving motors 320 and 330 are spaced out substantially 90 degrees from each other and the bracket 340 is spaced out substantially 135 degrees from each of the first and second driving motors 320 and 330. Preferably, a shock absorber 350 is disposed between the camera 210 and base plate 310. The shock absorber 350 prevents a vibration caused by operation of the first or second driving motor 320 or 330 from being transmitted to the camera 210. The shock absorber 350 may be made of rubber, plastic and the like having an elasticity.

In this embodiment, the peripheral surface of the base plate 310 is a convex surface having a predetermined curvature. The base plate 310 has first and second rails 312 and 314 respectively positioned at portions of the base plate 310 facing with the first and second driving motors 320 and 330. The first and second rails 312 and 314 have a predetermined length along the curvature of the peripheral surface of the base plate 310.

In this case, the actuator 300 further includes first and second guide blocks 322 and 332 respectively disposed at driving shafts of the first and second driving motors 320 and 330. The first and second guide blocks 322 and 332 respectively have first and second grooves 324 and 334 for inserting each of the first and second rails 312 and 314 thereinto. Each of the first and second grooves 324 and 334 has a predetermined length along the curvature of the peripheral surface of the base plate 310 and a width substantially equal to that of each of the first and second rails 312 and 314. Preferably, the width of each of the first and second grooves 324 and 334 is wider than each of the first and second rails 312 and 314. Further, front surface of each of the bracket 340, first and second guide blocks 322 and 332 have a curvature substantially equal to that of the peripheral surface of the base plate 310 to be closely contacted to the peripheral surface of the base plate 310. Therefore, when the first driving motor 320 is driven to rotate the first guide block 322, rotation force of the first guide block 322 is transmitted to the first rail 312 to rotate the base plate 310 in left or right direction. Simultaneously, the second rail 314 is moved along the second groove 334. To control the rotation force generated from the first and second driving motors 320 and 330, a reduction gear may be respectively disposed between each of the first and second guide blocks 322 and 332 and each of the driving shafts of the first and second driving motors 320 and 330.

Further, when the second driving motor 330 is driven to rotate the second guide block 332, rotation force of the second guide block 332 is transmitted to the second rail 314 to rotate the base plate 310 in an upper or lower direction. Simultaneously, the first rail 312 is moved along the first groove 324.

Preferably, the bell box 200 also has a first and second support 326 and 336 for respectively supporting lower portion of the first and second guide blocks 322 and 332. In this case, the lower portion of each of the first and second guide blocks 322 and 332 takes the shape of semi-cylinder, and upper portion of each of the first and second supports 326 and 336 has a semi-cylindrical recess. Preferably, a first bearing 328 is disposed between the first guide block 322 and the first support 326 so that the first guide block 322 is smoothly rotated. Also, a second bearing 338 is disposed between the second guide block 332 and the second support 336 so that the second guide block 332 is smoothly rotated. Further, a bearing 342 is disposed between the base plate 310 and the bracket 340 so that the base plate 310 is smoothly rotated.

Detailed description for the electronic lock 400 employed in the door videophone capable of rotating the camera is omitted because it has been known.

Hereinafter, operation of the door videophone capable of rotating the camera in accordance with the present invention will be described in detail, referring to FIGS. 4A to 4D.

When a caller turns on the bell switch 230 of the bell box 200 to ring the bell, a host lifts the handset 120 to turn on the hook switch 150 after hearing the bell. Then, the image of the caller photographed by the camera 210 is displayed on the monitor 110.

In this case, when the caller gets out of a photographing area of the camera 210 and, therefore, the camera 210 does not photograph the total looks of the caller, the host turns on the control switch 140 to rotate the camera 210 toward the caller. Then, the host may correctly observe the caller.

Figure 4A:
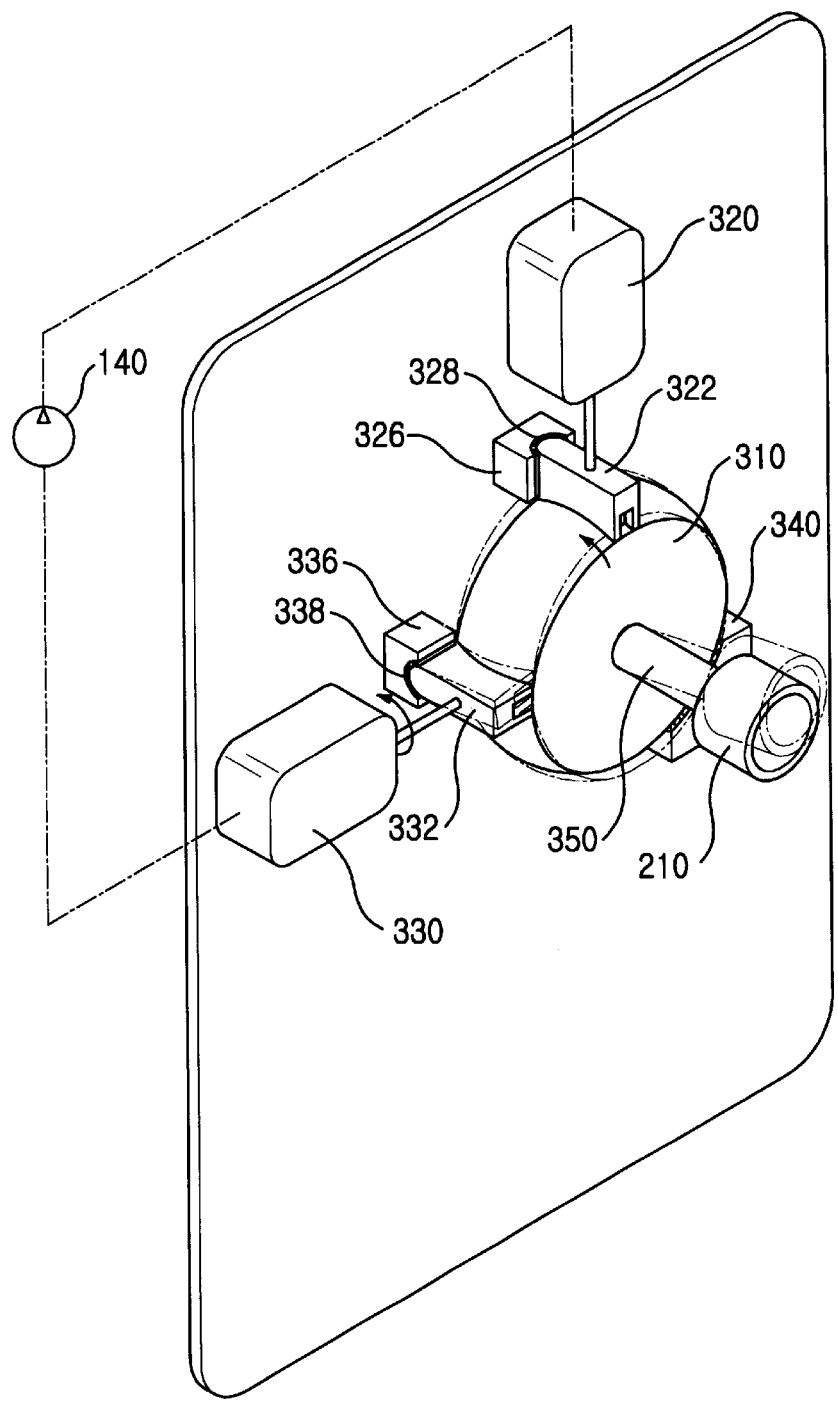
FIGS. 4A to 4D are perspective views schematically representing an operation state of the door videophone illustrated in the FIG. 3.
Figure 4B:
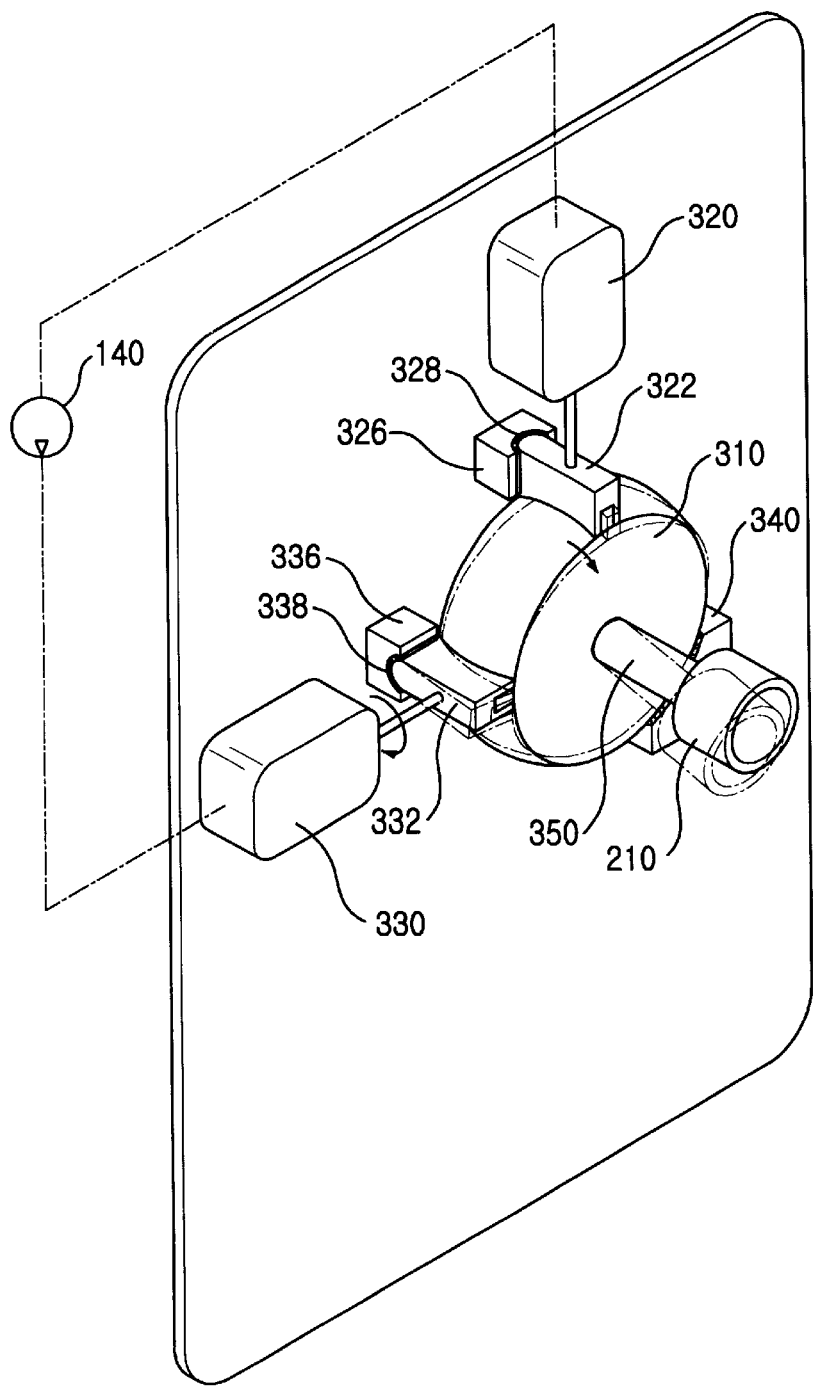

That is, referring to FIG. 4A, when the host presses the upper arrow of the control switch 140 to drive the second driving motor 330 clockwise, the second guide block 332 fixed to the driving shaft of the second driving motor 330 is rotated upwardly. Then, rotation force of the second guide block 332 is transmitted to the base plate 310 through the second rail 314 inserted into the groove 334 and, therefore, rotates the base plate 310 and camera 210 disposed at the base plate 310. Simultaneously, the first rail 312 is moved backwards along the groove 324 of the first guide block 322. On the contrary, referring to FIG. 4B, when the host presses the lower arrow of the control switch 140 to drive the second driving motor 330 counterclockwise, as in the above-mentioned principle, the base plate 310 and camera 210 disposed at the base plate 310 are rotated downward.

Figure 4C:
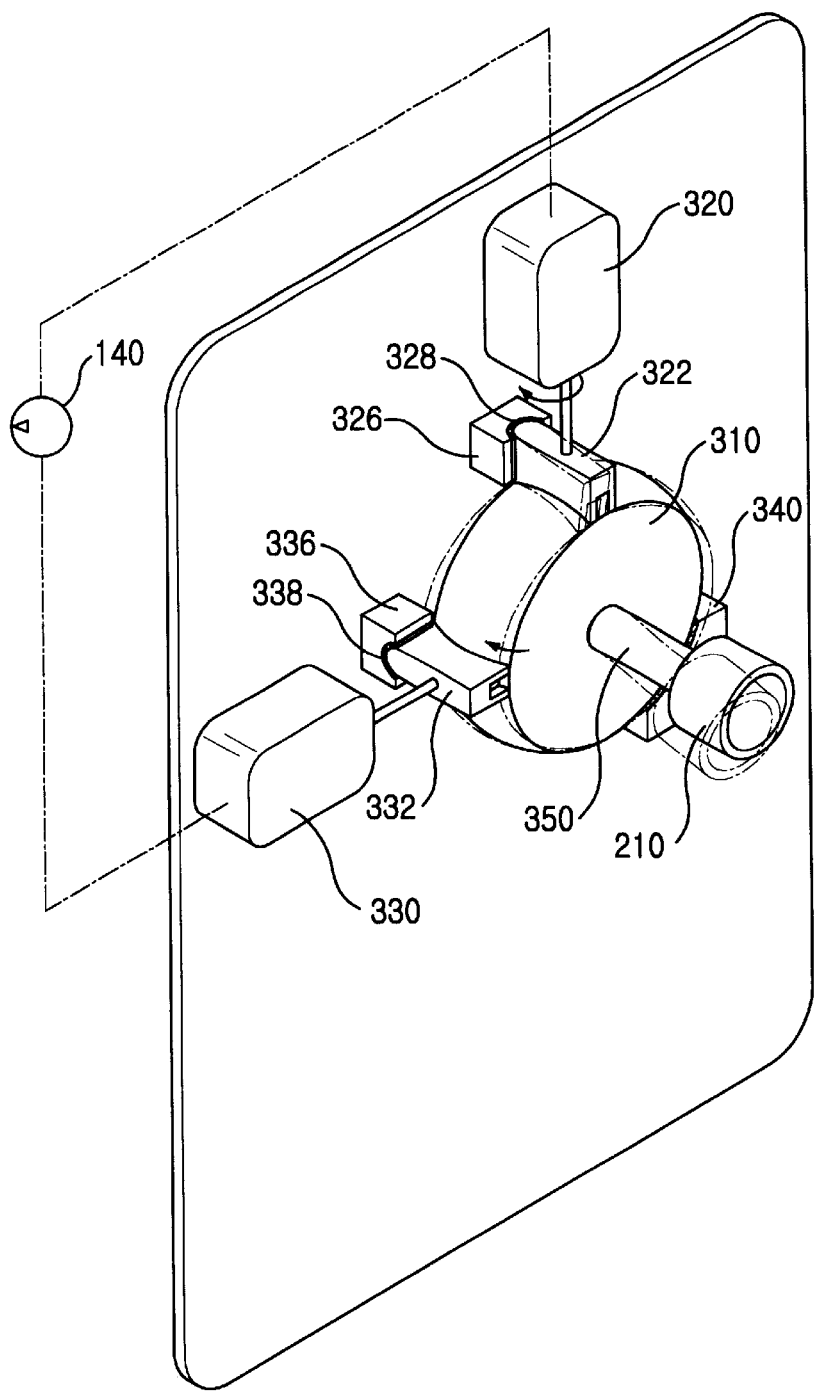
Figure 4D:
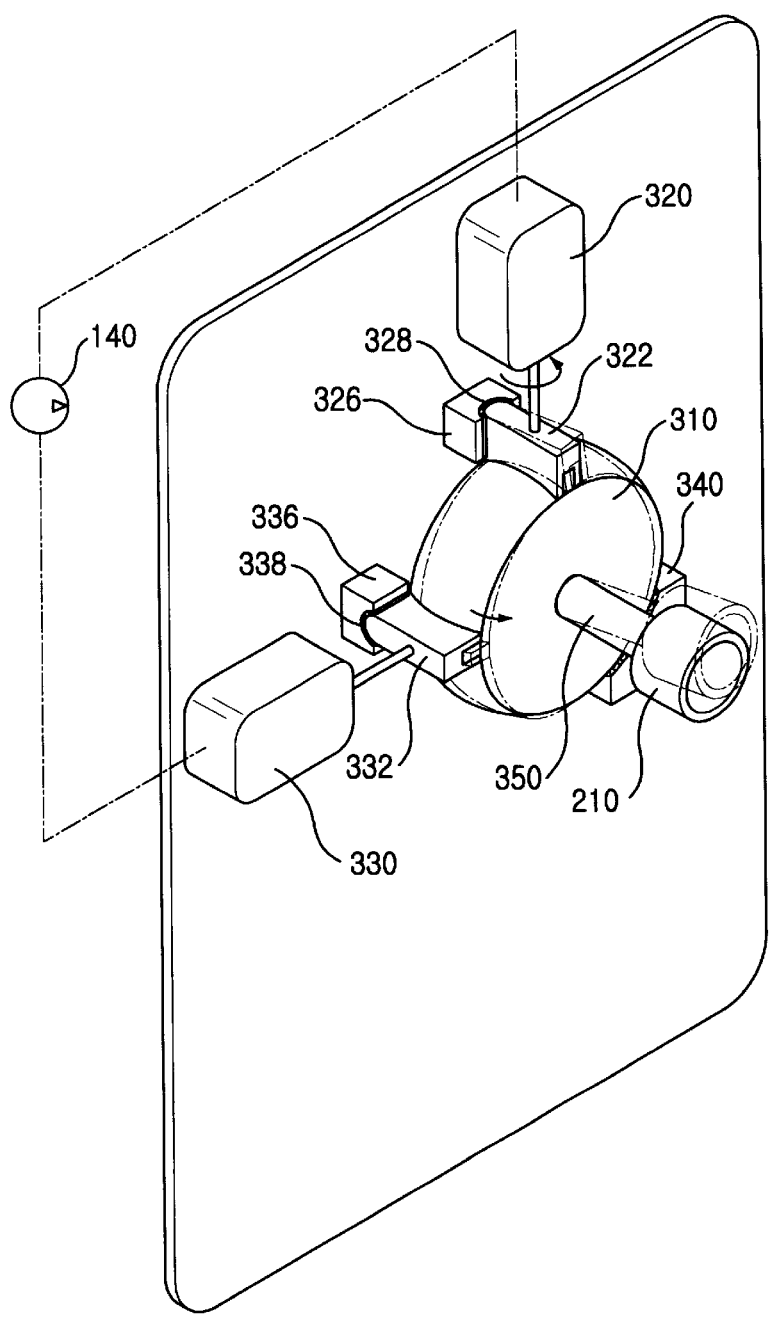

Further, referring to FIG. 4C, when the host presses the left arrow of the control switch 140 to drive the first driving motor 320 clockwise, the first guide block 322 fixed to the driving shaft of the first driving motor 320 is rotated left. Then, rotation force of the first guide block 322 is transmitted to the base plate 310 through the first rail 312 inserted into the groove 324 to rotate the base plate 310 and the camera 210 disposed at the base plate 310. Simultaneously, the second rail 314 is moved backwards along the groove 334 of the second guide block 332. On the contrary, referring to FIG. 4D, when the host presses the right arrow of the control switch 140 to drive the first driving motor 320 counterclockwise, as in the above-mentioned principle, the base plate 310 and camera 210 disposed at the base plate 310 are rotated right.

Figure 5:
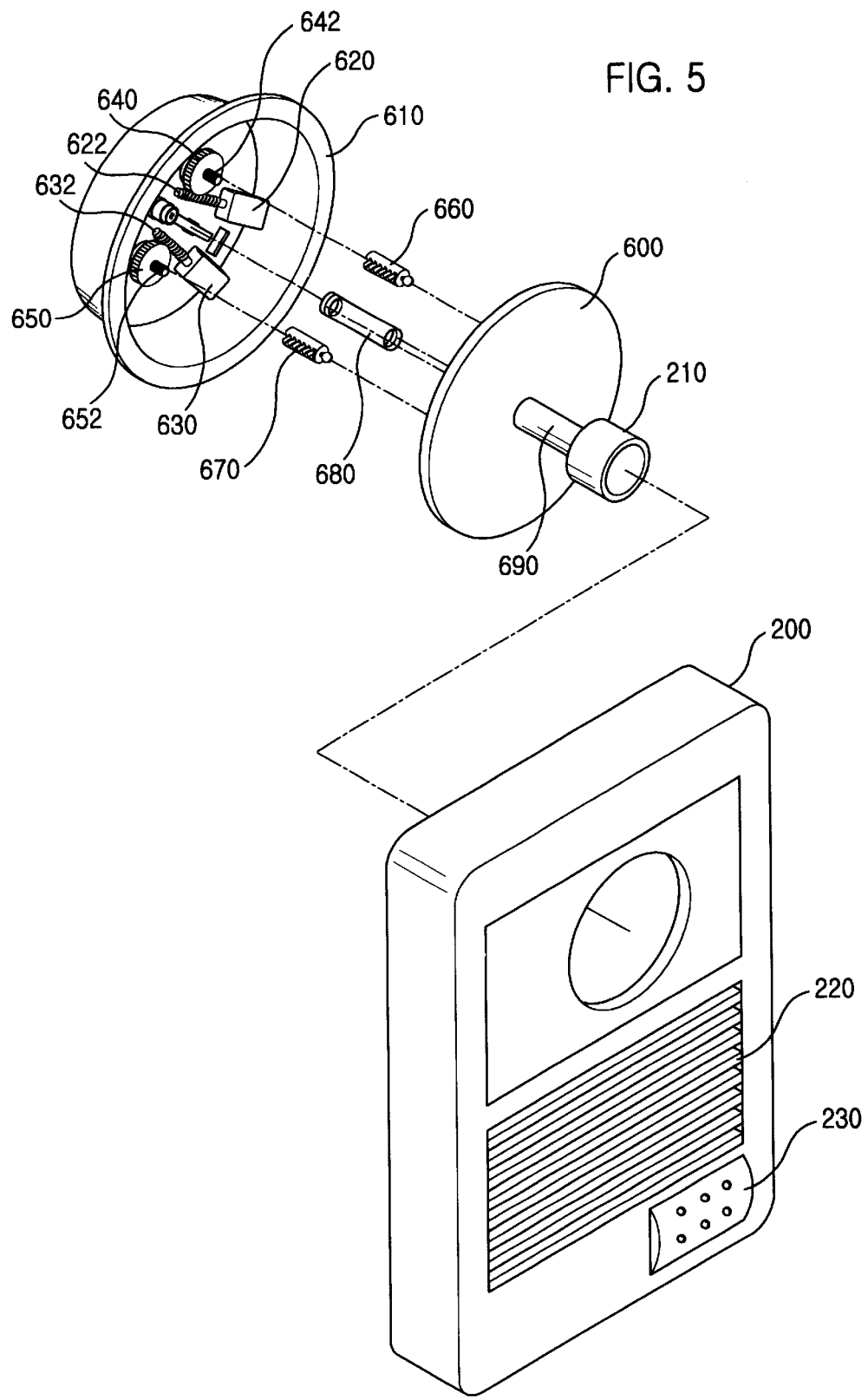
FIG. 5 is a disassembled perspective view showing another embodiment of the actuator employed in the door videophone of the present invention.
Figure 7A:
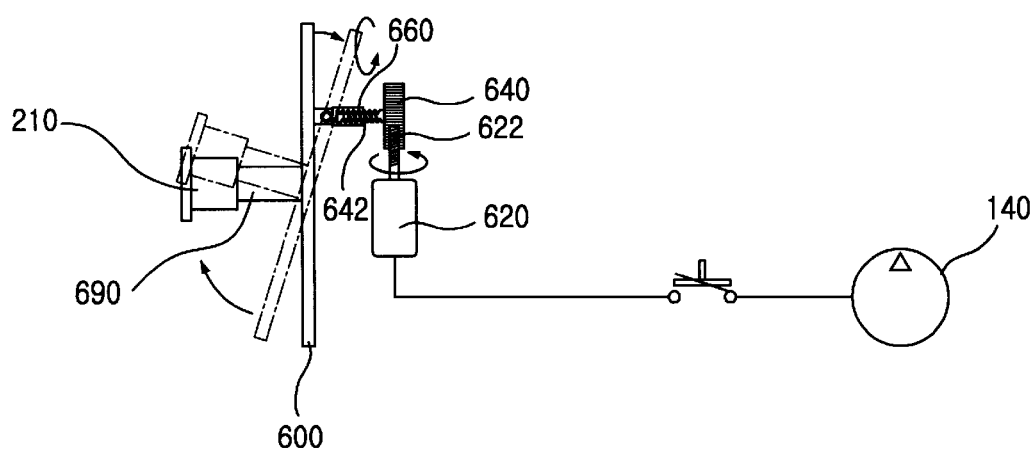
FIGS. 7A to 7D are perspective views schematically representing an operation state of the door videophone illustrated in the FIG. 6.
Figure 7B:
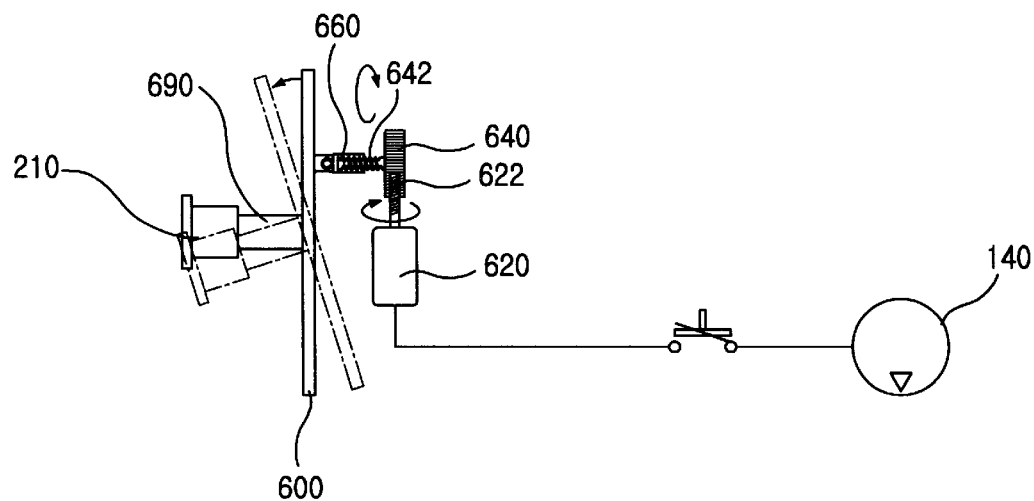
Figure 7C:
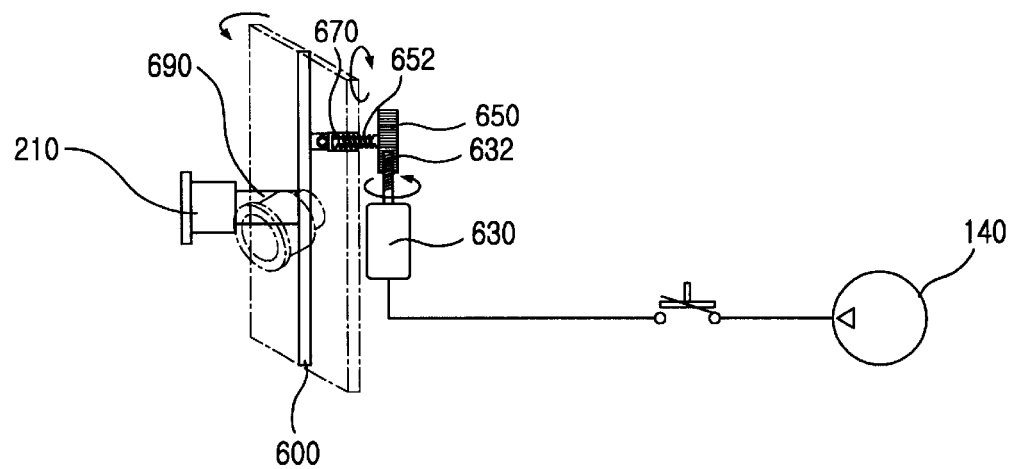
Figure 7D:
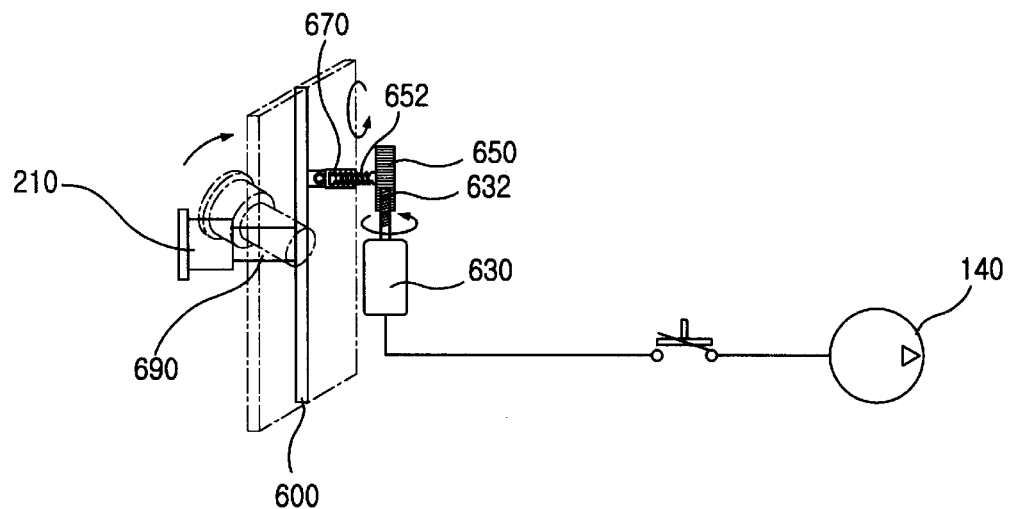

Referring to FIGS. 5 and 7D, there is shown another embodiment of the actuator employed in the door videophone of the present invention.

Figure 6:
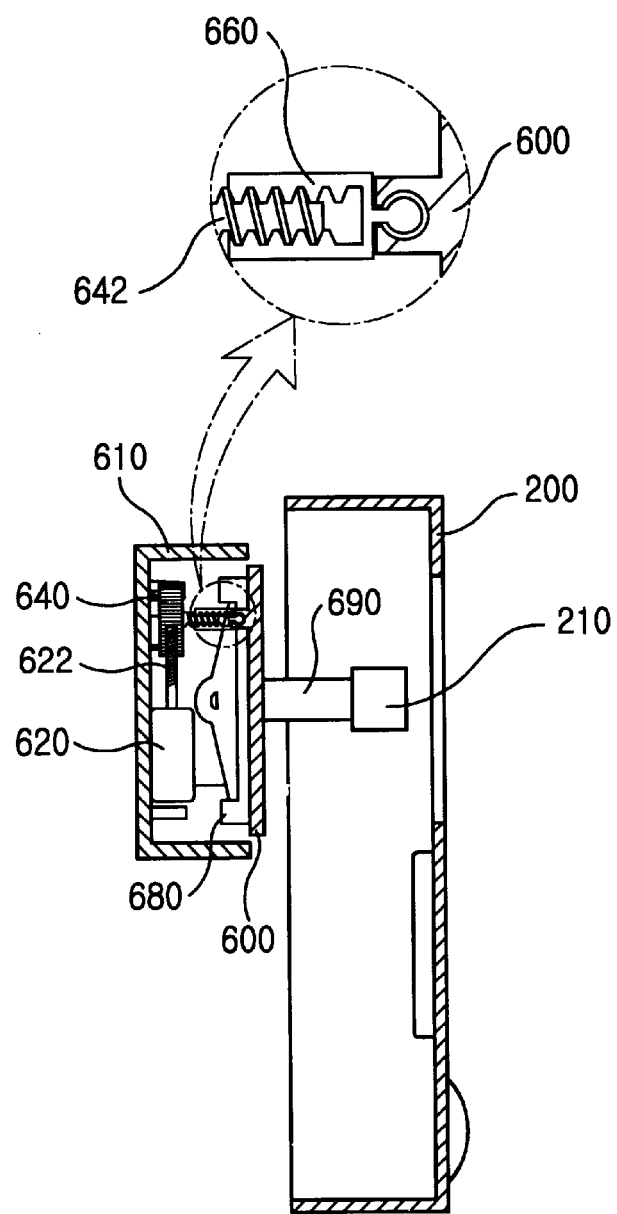
FIG. 6 is a schematic cross-sectional view of the door videophone assembling the actuator of the FIG. 5.

Referring to FIGS. 5 and 6, the actuator in accordance with another embodiment of the present invention includes a base plate 600 for supporting the camera 210 thereon, a housing 610, first and second driving motors 620 and 630 respectively having first and second worm gears 622 and 632, a first wheel gear 640 engaged with the first worm gear 622 and a second wheel gear 650 engaged with the second worm gear 632.

The first and second motors 620 and 630 are respectively driven as the control signal is outputted from the control switch 140, clockwise or counterclockwise. Further, when the first and second driving motors 620 and 630 are driven, the first and second wheel gears 640 and 650 respectively engaged with the first and second worm gears 622 and 632 are rotated. The first and second wheel gears 640 and 650 are spaced out about 90 degrees from each other.

In this case, first and second screw shafts 642 and 652 are respectively disposed on center portion of the first and second wheel gears 640 and 650. Each of the first and second screw shafts 642 and 652 are rotated together with each of the first and second wheel gears 640 and 650.

Further, first and second racks 660 and 670 are respectively disposed on portions of the base plate 600 facing with the first and second screw shafts 642 and 652. The first and second racks 660 and 670 are joined to the base plate 600 in the universal joint type. The first and second racks 660 and 670 are respectively engaged with the first and second screw shafts 642 and 652. Therefore, the first and second racks 660 and 670 are respectively moved by rotation of each of the first and second screw shafts 642 and 652, upward or downward. The first and second racks 660 and 670 are substantially cylindrical in shape having screw thread capable of being respectively engaged with the first and second screw shafts 642 and 652 therein.

The actuator in accordance with the embodiment also has a support 680 disposed between the first and second motors 620 and 630, and a shock absorber 690 disposed between the base plate 600 and the camera 210. The support 680 is contacted to back surface of the base plate 600. The support 680 can rotate around its center portion. The shock absorber 690 prevents a vibration caused by operation of the first or second driving motors 620 or 630 from being transmitted to the camera 210.

Referring to FIG. 7A, when a host turns on the upper arrow of the control switch 140 to drive the first driving motor 620, the worm gear 622 rotates to move the first wheel gear 640 and first screw shaft 642 clockwise. Then, the first rack 660 engaged with the first screw shaft 642 is moved backward to rotate the base plate 600 and the camera 210 upward.

On the contrary, referring to FIG. 7B, when the host turns on the lower arrow of the control switch 140 to drive the first driving motor 620, the worm gear 622 rotates to move the first wheel gear 640 and first screw shaft 642 counterclockwise.

Then, the first rack 660 engaged with the first screw shaft 642 is moved counterclockwise to push the upper portion of the base plate 600 and the camera 210 rotates downward.

On the other hand, referring to FIG. 7C, when the host turns on the left arrow of the control switch 140 to drive the second driving motor 630, the worm gear 632 rotates to move the second wheel gear 650 and second screw shaft 652 clockwise.

Then, the second rack 670 engaged with the second screw shaft 652 is moved backward to pull the left portion of the base plate 600 and the camera 210 rotates left.

Further, referring to FIG. 7D, when the host turns on the right arrow of the control switch 140 to drive the second driving motor 630, the worm gear 632 rotates to move the second wheel gear 650 and second screw shaft 652 counterclockwise.

Then, the second rack 670 engaged with the second screw shaft 652 is moved forward to push the left portion of the base plate 600 and the camera 210 rotates right.

In accordance with the present invention, though the caller gets out the photographing area of the camera, the host rotates the camera to correctly observes the caller.

While the present invention has been described with respect to certain preferred embodiments only, other modifications and variation may be made without departing from the spirit and scope of the present invention as set forth in the following claims.

What is claimed is:

1. A door videophone capable of rotating a camera, comprising:

a main body having a monitor for displaying an image of a caller, and being located indoors;

a bell box having the camera for photographing looks of the caller and transmitting the image of the caller to the monitor, and being located outdoors;

an actuating means for rotating the camera, and being disposed in the bell box, wherein the actuating means includes:

a base plate for supporting the camera;

at least one driving means for generating a rotation force; and at least one rotation force transmitting means for transmitting the rotation force generated by the driving means to the base plate, and being respectively connected to the driving means, wherein the driving means includes:

at least one first driving motor for rotating the base plate upward and downward as to an operation control signal; and at least one second driving motor for rotating the base plate left and right as to the operation control signal; and a control means for generating the operation control signal associated with the actuating means, and being disposed at the main body, wherein the door videophone has one first and second driving motors capable of rotating clockwise and counterclockwise, wherein the first and second driving motors are spaced out substantially 90 degrees, wherein the base plate includes a convex peripheral surface having a predetermined curvature and a pair of rails respectively facing with the rotation force transmitting means, and wherein the rotation force transmitting means respectively includes a first and second guide blocks having a groove, wherein the groove has a width substantially equal to that of each of the rails and a predetermined length.

2. The door videophone as recited in claim 1, further comprising at least one bracket closely disposed at a side portion of the base plate to support the base plate during rotation of the base plate.

3. The door videophone as recited in claim 1, further comprising first and second support members for respectively supporting the first and second guide blocks, wherein a lower portion of each of the first and second guide blocks are semi-cylindrical in shape and upper portion of each of the first and second support members has a semi-cylindrical recess to be contacted to the lower portion of each of the first and second guide blocks.

4. An actuator for rotating a camera upward, downward, left and right, comprising:

a base plate for supporting the camera;

at least one first driving means for generating a rotation force to rotate the base plate upward and downward;

at least one first transmitting means for transmitting the rotation force generated by the first driving means to the base plate;

at least one second driving means for generating a rotation force to rotate the base plate left and right;

at least one second transmitting means for transmitting the rotation force generated by the second driving means to the base plate; and a control means for generating an operation control signal associated with the first and second driving means, wherein the first driving means includes a first driving motor for generating the rotation force as to the operation control signal, wherein the first driving motor has a driving shaft connected to the first transmitting means, wherein the second driving means includes a second driving motor for generating the rotation force as to the operation control signal, wherein the second driving motor has a driving shaft connected to the second transmitting means, wherein the first and second driving motors are spaced out substantially 90 degrees, wherein the base plate includes a convex peripheral surface having a predetermined curvature and a pair of rails, along the curvature, respectively facing with the first and second transmitting means, and wherein the first and second transmitting means respectively include a first and second guide blocks respectively having a groove, wherein the groove has a width substantially equal to that of the rail and a predetermined length.

5. The actuator as recited in claim 4, further comprising at least one bracket closely disposed at a side portion of the base plate to support the base plate.

6. The actuator as recited in claim 5, further comprising first and second support members for respectively supporting the first and second guide blocks, wherein a lower portion of each of the first and second guide blocks are semi-cylindrical in shape and upper portion of each of the support members has a semi-cylindrical recess to be contacted to the lower portion of each of the first and second blocks.

7. The actuator as recited in claim 6, further comprising a shock absorb member disposed between the base plate and the camera to prevent a vibration generated by operation of the first and second driving motors from transmitting to the camera.

* * * * *